US008218709B2

(12) United States Patent
Eckardt

(10) Patent No.: US 8,218,709 B2
(45) Date of Patent: Jul. 10, 2012

(54) NUCLEAR PLANT AND METHOD FOR THE PRESSURE RELIEF IN A NUCLEAR PLANT

(75) Inventor: Bernd Eckardt, Bruchköbel (DE)

(73) Assignee: Areva NP GmbH, Erlangen (DE)

( * ) Notice: Subject to any disclaimer, the term of this patent is extended or adjusted under 35 U.S.C. 154(b) by 1078 days.

(21) Appl. No.: 11/318,999

(22) Filed: Dec. 27, 2005

(65) Prior Publication Data
US 2006/0188055 A1    Aug. 24, 2006

Related U.S. Application Data

(63) Continuation of application No. PCT/EP2004/006837, filed on Jun. 24, 2004.

(30) Foreign Application Priority Data

Jun. 25, 2003  (DE) .................................. 103 28 773

(51) Int. Cl.
*G21C 9/004* (2006.01)
(52) U.S. Cl. ...................... 376/283; 376/309; 376/314
(58) Field of Classification Search .................. 376/283, 376/309, 314
See application file for complete search history.

(56) References Cited

U.S. PATENT DOCUMENTS

| 3,800,511 A | * | 4/1974 | Hull .................. 96/236 |
| 3,853,502 A | * | 12/1974 | Dorr et al. ................ 95/198 |
| 3,914,815 A | * | 10/1975 | Kobayashi .................. 15/3.5 |
| 4,272,499 A | * | 6/1981 | Cason et al. ............ 423/243.08 |
| 4,469,493 A | * | 9/1984 | Tuovinen et al. ................ 95/201 |
| 4,863,677 A | | 9/1989 | Eckardt |
| 4,873,050 A | | 10/1989 | Eckardt |
| 4,911,481 A | * | 3/1990 | Oberdorfer-Bogel ........ 285/116 |
| 4,931,263 A | * | 6/1990 | Wakui et al. ................ 423/215.5 |
| 5,017,331 A | * | 5/1991 | Eckardt ......................... 376/313 |
| 5,043,158 A | * | 8/1991 | Sleytr et al. .............. 424/197.11 |
| 5,227,127 A | | 7/1993 | Sato |

(Continued)

FOREIGN PATENT DOCUMENTS

DE             36 37 795 A1      5/1988

(Continued)

OTHER PUBLICATIONS

Encyclopedia Brittanica, Brittanica Online, Academic Edition (http://www.search.eb.com), on "measuring the speed of sound" (two pages).*

(Continued)

*Primary Examiner* — Johannes P Mondt
(74) *Attorney, Agent, or Firm* — Laurence A. Greenberg; Werner H. Stemer; Ralph E. Locher

(57) ABSTRACT

A nuclear installation has a reactor containment which is connected to a pressure relief line. A Venturi scrubber, which is arranged in a vessel containing a washing liquid, and a throttle device are connected in series in the pressure relief line. The novel system restrains, with particularly high reliability, fine air-transported activities or aerosols during decompression such that release thereof into the environment is practically impossible. The Venturi scrubber and the throttle device are dimensioned in such a way that, in the case of a critical drop in pressure of an air-vapor mixture flowing in the decompression line, a flow speed of said air-vapor mixture of more than 150 m/s, preferably more than 200 m/s, can be adjusted with respect to the throttle device in the Venturi scrubber.

21 Claims, 2 Drawing Sheets

U.S. PATENT DOCUMENTS

| | | | |
|---|---|---|---|
| 5,267,283 | A | 11/1993 | Berg et al. |
| 5,279,646 | A * | 1/1994 | Schwab .......................... 95/201 |
| 5,353,949 | A * | 10/1994 | Seibert et al. ................. 220/371 |
| 5,473,647 | A * | 12/1995 | Eckardt ......................... 376/308 |
| 5,872,825 | A | 2/1999 | Eckardt |
| 6,047,602 | A * | 4/2000 | Lynnworth ..................... 73/632 |
| 6,149,715 | A * | 11/2000 | Keinanen et al. ............... 95/219 |
| 6,280,502 | B1 | 8/2001 | Van Veen et al. |
| 6,513,345 | B1 | 2/2003 | Betting et al. |

FOREIGN PATENT DOCUMENTS

| | | |
|---|---|---|
| DE | EP 0 285 845 A1 | 10/1988 |
| DE | 38 15 850 A1 | 11/1989 |
| DE | 41 41 496 A1 | 7/1992 |
| DE | 195 32 366 C1 | 12/1996 |
| EP | 0 285 845 A1 | 10/1988 |
| EP | 0 507 155 A1 | 10/1992 |
| SU | 1768 242 A1 | 10/1992 |
| WO | WO 90/16071 * | 12/1990 |

OTHER PUBLICATIONS

From on-line Academic Press Dictionary of Science and Technology, XREFERPLUS, meanings of "throttle" and "choke". See http//www.xreferplus.com.*

* cited by examiner

NUCLEAR PLANT AND METHOD FOR THE PRESSURE RELIEF IN A NUCLEAR PLANT

CROSS-REFERENCE TO RELATED APPLICATION

This is a continuation, under 35 U.S.C. §120, of copending international application PCT/EP2004/006837, filed Jun. 24, 2004, which designated the United States; this application also claims the priority, under 35 U.S.C. §119, of German patent application No. 103 28 773.6, filed Jun. 25, 2003; the prior applications are herewith incorporated by reference in their entirety.

BACKGROUND OF THE INVENTION

Field of the Invention

The invention lies in the field of nuclear engineering. More specifically, the invention relates to a nuclear system with a safety containment to which a pressure relief line is connected. It relates, further, to a method for the decompression of a system of this type.

In a nuclear power plants, incidents or accident situations must be expected to entail a possibly significant pressure rise within the safety containment, depending on the respective incident and on countermeasures initiated where appropriate, such as, for example, the inertization of the containment atmosphere. In order to avoid possibly resulting structural damage to the safety containment per se or even to system components arranged in it, nuclear power stations can be designed for an on-demand depressurization of the containment by the discharge of containment atmosphere (venting). For this purpose, conventionally, a pressure relief line is connected to the safety containment of a nuclear system.

The containment atmosphere, however, normally contains radioactive material, such as, for example, noble gases, iodine or aerosol, which could pass into the surroundings of the nuclear power station during venting. Particularly in the case of comparatively serious incidents with the possible occurrence of core melt, airborne activity quantities (aerosols) may arise in particularly high concentrations within the containment, so that, if there are serious leaks or if inadmissible overpressure situations arise, a release of significant quantities of such aerosols or activity quantities into the surroundings of the nuclear system could occur. Airborne activities of this type could cause comparatively long-term land contamination, particularly on account of the high half-lives of possibly entrained components, such as, for example, iodine or cesium isotopes. In order to avoid this, the depressurization systems provided for venting the containment atmosphere are conventionally provided with filter or retention devices which are intended to prevent a release of airborne activity quantities entrained in the containment atmosphere into the surroundings.

For this purpose, for example, European patent EP 0 285 845 B1 and U.S. Pat. No. 4,873,050 disclose a concept for the pressure relief of a nuclear power station, in which a Venturi scrubber provided as a filter for the retention of airborne activities and also a throttle device are connected in series into a pressure relief line connected to the safety containment of the nuclear power station. The Venturi scrubber in this case comprises a number of Venturi tubes which are disposed in a washing liquid reserved in a vessel and which can be acted upon by the gas stream carried in the pressure relief line.

The Venturi tubes in this case each comprise a nozzle-like constriction at which the gas stream flowing through is accelerated to a particularly high flow velocity. In the region of this constriction point, ingress ports are provided for the washing liquid, the entering washing liquid being entrained by the gas stream flowing through. Owing to the comparatively high flow velocity of the gas stream at this point, a fragmentation of the washing liquid takes place, airborne activities or aerosols entrained in the gas stream being introduced into the liquid droplets thereby occurring. Thus, as a result of a subsequent droplet separation from the gas stream, it is possible to remove a large part of the entrained aerosols or airborne activities.

In the system described in EP 0 285 845 B1 and U.S. Pat. No. 4,873,050, the throttle device connected in series with the Venturi scrubber is designed for operation with what is known as critical depressurization. In critical depressurization, the pressure conditions in the line system, that is to say, in particular, the pressure drop across the throttle device, are established such that the medium flowing in the line flows through the throttle device at sound velocity. In the system according to EP 0 285 845 B1 and U.S. Pat. No. 4,873,050, this effect is utilized, in a response situation, that is to say during a depressurization of the containment, to set a volumetric throughput in the pressure relief line which is constant over time.

SUMMARY OF THE INVENTION

It is accordingly an object of the invention to provide a nuclear installation and a pressure relief method for a nuclear installation which overcomes the above-mentioned disadvantages of the heretofore-known devices and methods of this general type and, in which, in the event of depressurization, even the finest possible airborne activities or aerosols are retained in the Venturi scrubber with particularly high reliability, so that a release into the surroundings is ruled out with particularly high reliability. Furthermore, a method for the depressurization of a nuclear system of this type is to be specified.

With the foregoing and other objects in view there is provided, in accordance with the invention, a nuclear plant, comprising:
  a containment;
  a pressure relief line communicating with said containment;
  a throttle device and a Venturi scrubber connected in series in said pressure relief line, said Venturi scrubber being disposed in a vessel with a washing liquid;
  said Venturi scrubber and said throttle device being dimensioned to establish, in the event of a critical depressurization of an air/vapor mixture flowing in said pressure relief line and through said throttle device, a flow velocity of the air/vapor mixture of more than 150 m/s, or above 200 m/s, in the Venturi scrubber.

In other words, the objects of the invention are achieved, in that the Venturi scrubber and the throttle device are dimensioned such that, in the event of a critical depressurization of an air/vapor mixture flowing in the pressure relief line, a flow velocity of the air/vapor mixture of more than 150 m/s, preferably of more than 200 m/s, is set at the throttle device in the Venturi scrubber.

Dimensioning in this case preferably takes place in such a way that this high velocity prevails predominantly in the entire operating overpressure range of the separation device, independently of the respective operating pressure of, for example, 2-10 bar. The Venturi pressure losses of, for example, >0.5 bar at 1 bar and, for example, >2 bar at pressures >5 bar, which occur in the case of a higher operating pressure of the washer device for generating the corresponding acceleration of the gases of higher density, are in this case set passively over the entire operating range as a result of the combination of the Venturi scrubber and the throttle.

The invention proceeds in this case from the consideration that, for the separation of airborne activities or aerosols, a comparatively fine droplet mist is generated in a Venturi scrubber or a Venturi tube as a result of the flow conditions prevailing in the tube interior when water is fed into the latter, the airborne activities or aerosols to be separated being capable of being introduced into such droplets and therefore of being removed from the gas stream together with these. A particularly high separation action even for the finest possible aerosols can thus be achieved, in that the probability with which the aerosols impinge onto suitable water droplets, in particular with the assistance of correspondingly high washing liquid loads, and are included in these water droplets is kept particularly high.

As surprisingly became apparent, precisely with regard to Venturi tubes in which the feed of the washing liquid into the tube interior is ensured in the manner of a passive type of construction via the underpressure prevailing at the constriction point and therefore without external drive means, the probability of impingement and inclusion of even the finest possible aerosols in the droplet mist rises to a considerable, highly superproportional extent, so that, in the case of very high flow velocities of the gas stream in the Venturi tube, separation rates for mixed aerosols with a particle size of about 1 μm of more than 99.9% and for comparatively fine aerosols with a particle size of less than 0.5 μm of 98% and above can be achieved in the washing liquid. The depressurization and activity retention system of the nuclear system is therefore designed for maintaining such high flow velocities in the depressurization situation.

In order in this case, precisely with regard to the characteristic parameters, such as, for example, system pressure, which possibly change to a great extent in the event of an incident scenario over the entire course of the incident, to ensure such a high separation rate in every phase of a possible incident and therefore to prevent to the greatest possible extent a release of contaminating constituents into the surroundings in every phase of an incident, the depressurization and activity retention system of the nuclear system is moreover designed for such a high degree of separation virtually independently of the system pressure prevailing in the safety containment of the nuclear system. In this case, deliberate use is made of the knowledge that, in the case of a throttle device operating with what is known as critical depressurization, the flow medium flows through said throttle device at its sound velocity independently of the prevailing inlet pressure.

Thus, in the state of critical depressurization, the volumetric throughput through the throttle device is constant independently of the prevailing inlet pressure. A suitable combination of the Venturi scrubber with the throttle device and, if appropriate, with a metallic fine aerosol follow-up filter can thus ensure that, in the event of critical depressurization via the throttle device, the volumetric throughput of the flowing medium through the Venturi scrubber and, if appropriate, through the fine aerosol follow-up filter can be kept virtually constant independently of the system pressure prevailing in the safety containment and transferred to the inlet side of the throttle device. Thus, by the throttle device being combined with the Venturi scrubber, a uniformly high degree of separation at the Venturi scrubber and, if appropriate, at the fine aerosol follow-up filter can be ensured virtually over the entire incident scenario, to be precise as long as critical depressurization via the throttle device occurs due to the prevailing pressure conditions.

For this purpose, the Venturi scrubber and the throttle device are in each case suitably dimensioned in the manner of coordination with one another, so that, in the case of critical depressurization occurring at the throttle device, the desired flow conditions with a particularly high flow velocity in the Venturi scrubber and, if appropriate, an optimum velocity in the fine aerosol follow-up filter are established. The minimum flow velocity of the flow medium in the Venturi scrubber which is required for the desired high degree of separation may in this case depend on the exact composition of the flow medium and may shift toward higher values in the case of changing gas compositions, for example in the case of a higher $H_2$ fraction.

As became apparent, however, a sufficiently high degree of separation can be achieved for the flow media possibly occurring in the event of the depressurization of the safety containment of a nuclear system, in that the combination of the Venturi scrubber and the throttle device is designed and dimensioned in the manner of a calibration or reference, in such a way that, in the case of an air/vapor mixture flowing in the pressure relief line, with critical depressurization occurring at the throttle device, a flow velocity of the air/vapor mixture of more than 150 m/s, preferably of more than 200 m/s, prevails in the Venturi scrubber. The flow velocity of the flow medium is in this case determined particularly in the region of the constriction point of the respective Venturi tube.

The high velocity set via the combination of the Venturi scrubber and throttle device may shift toward even higher values in the event of changing gas compositions, for example a higher $H_2$ fraction, on account of the higher sound velocity. It was found, furthermore, that a critical maximum velocity of approximately 270-300 m/s is established in the two-phase mixture consisting of gas mixture and washing liquid in the Venturi scrubber. Owing to the preferred selection of a particularly high Venturi design velocity of, for example, 200 m/s, which corresponds approximately to ⅔ of the maximum two-phase mixture velocity of about 300 m/s, it can thus be ensured that, even in the presence of mixtures with a higher sound velocity, inherently reliable throughput limitation becomes possible and the following retention devices are reliably protected against overload.

Advantageously, the Venturi scrubber comprises a plurality of Venturi tubes. These may be designed as what are known as short Venturi tubes, the outlets of which are arranged below the intended desired level of the washing liquid, so that the Venturi tubes are immersed essentially completely in the washing liquid. In this case, it proves to be particularly beneficial that the higher-lying separator filter section is protected by an overflow weir against the water backwash occurring, so that, in this variant, too, a reduced component height becomes possible. In this embodiment, a combination with a following metal fiber filter proves to be particularly advantageous for a particularly high overall separation.

By means of Venturi nozzle tubes ejecting primarily above the washing liquid, the water backwash determining the component size can be minimized, and, furthermore, a markedly higher empty tube velocity can be set in the Venturi washing device. This results in a considerably smaller Venturi scrubber diameter and a smaller component height and also a correspondingly reduced consumption of washing liquid. Due to the compact type of construction made possible thereby, particularly in combination with existing water reservoirs, the easy integration of the device even in particularly protected building parts of the system, such as, for example, the reactor building, along with a reduced outlay in terms of shielding, becomes possible.

Advantageously, a comparatively large fraction of the Venturi tubes is therefore designed as what are known as long Venturi tubes, the outlets of which are arranged above the intended desired level of the washing liquid. In order, furthermore, to prevent a sedimentation in the region of the vessel, which could lead to an increased maintenance and care requirement, in a further advantageous embodiment the Venturi scrubber is designed for a comparatively intensive swirling and circulation of the washing liquid in the operating situation. For this purpose, advantageously, a small fraction of the Venturi tubes, preferably up to about 10%, is arranged with a downwardly directed outlet direction within the vessel and below the desired level of the washing liquid.

It has proved particularly beneficial for ensuring high separation rates to set a comparatively high water load in the Venturi scrubber of, for example, more than 5 liters, preferably more than 10 liters, of washing liquid per cubic meter of gas. In order to ensure this, in a further advantageous embodiment, the Venturi tubes have an annular slit feed extending over the nozzle circumference and having an opening angle of 20° to 85°, preferably of 30° to 45°. For such a high water load, furthermore, the Venturi tubes of the Venturi scrubber advantageously have in each case a ratio of their neck cross-sectional area to the inlet area for the washing liquid of less than 10:1, preferably of about 3:1. The neck cross-sectional area in this case indicates the cross-sectional area, through which the flow medium can flow freely, at the constriction point within the respective Venturi tube.

In a particularly advantageous embodiment, the Venturi tubes of the Venturi scrubber are designed in such a way that the passive intake and distribution of washing liquid are ensured into the core jet region inside the Venturi tube on account of the underpressure generated by the medium flowing through. For this purpose, the Venturi tubes of the Venturi scrubber are advantageously designed as round Venturi tubes with a neck width of less than about 80 mm, preferably of less than about 40 mm, or as flat Venturi nozzles with a neck width of less than about 100 mm. Additionally, or alternatively, the Venturi tubes of the Venturi scrubber advantageously have a ratio of height to neck width of more than 5, preferably of more than 10.

A particularly compact type of construction for the depressurization and activity retention system assigned to the nuclear system, with a correspondingly reduced outlay in terms of production and of assembly and with the capability of easy accommodation in the protected system region, can be achieved in that the vessel equipped with the Venturi scrubber is advantageously connected on the washing-fluid side to a further washing liquid store. Consequently, the quantity of washing liquid reserved in the vessel itself can be kept comparatively small, while, if required, that is to say, in particular, in the case of the occurrence of a consumption of washing liquid, an on-demand afterfeed from the further washing liquid store may be provided. The in this sense inactive, in particular larger, washing liquid reservoir may in this case be stored in a separate storage vessel and, in particular, serve for topping up evaporated washing liquid. The filling level in the vessel may in this case be set passively by the further washing liquid store being arranged at the same geodetic height or by means of a filling-level float control. In this case, in particular, further water reservoirs already provided in any case, such as, for example, wastewater tanks, demineralized water supply or the like, may also be utilized as a further washing liquid store, while the on-demand feed of washing liquid into the vessel may take place via gradients or by means of diaphragm pumps operated from a compressed-air accumulator, independently of the possibly failed power supply.

Particularly effective activity retention can be achieved in that the depressurization and activity retention system assigned to the nuclear system is designed, in a particularly advantageous embodiment, for an on-demand recirculation of the airborne activities or aerosols separated in the washing liquid into the containment. For this purpose, in a particularly advantageous embodiment, the vessel provided with the Venturi scrubber is connected on the washing-fluid side to the interior of the safety containment via a feedback line of the nuclear system. By virtue of such an embodiment, if required, that is to say, in particular, constantly or at cyclic intervals, the washing liquid laden with activities or aerosols removed from the gas stream can be displaced completely or partially into the safety containment, so that the activity overall requiring treatment remains reliably in the containment. By virtue of the activity reduction in the washing liquid achieved by means of the feedback, resuspension effects occurring, which could lead to the discharge of activity into the following filter devices, are minimized.

In this case, an afterfeed of the washing liquid into the vessel, in particular from the further washing liquid reservoir can take place. As a result of such a recirculation or feedback of the activities, the activity quantity and concentration contained overall in the washing liquid can be kept particularly low, so that, for example, even resuspension effects leading to the discharge of activity into following filter devices can be kept particularly low. As a result, in combination with the high Venturi degree of separation, a reduction in the filter load and consequently in the filter surfaces required is possible. Furthermore, particularly in the case of a comparatively lengthy venting operation over several days, a significant improvement in activity retention, particularly with regard to iodine and with aerosols, can be achieved.

Furthermore, as a result of such a feedback or recirculation of the activities separated in the Venturi scrubber, the decay heat occurring via the aerosols or airborne activities is kept away from the vessel and is displaced back into the containment, so that the possible loads occurring as a result of this in the vessel, for example due to fluid evaporation, can be kept particularly low, so that a comparatively lengthy venting operation over several days and weeks thereby becomes possible, without the following metal fiber fine filters being overloaded by resuspension aerosols and iodine separation at the iodine sorption filter being overloaded by iodine resuspension. Such design requirements with long-term venting operation can therefore be fulfilled reliably and particularly cost-effectively even for recent reactor systems with increased requirements with regard to the control of serious incidents, for example in combination with independent washing liquid afterfeed, for example via diaphragm pumps, etc., and activity recirculation into the containment via quantity-limiting throttles.

Precisely because the evaporation of washing liquid can thereby be avoided, the overall result, that is to say also taking into account the possibly provided afterfeed of washing liquid into the vessel, is an overall reduced requirement of washing liquid.

In order to keep particularly low the number of required leadthroughs through the safety containment of the nuclear system which are designed with a view to considerable safety requirements, in a further advantageous embodiment the feedback line is in this case connected to the interior of the safety containment via the pressure relief line. Recirculation or feedback in this case takes place by jet feed into the central region of the pressure relief line, so that a transfer of the activity-laden washing liquid into the containment can take place in countercurrent to the depressurization gas stream.

Advantageously, the Venturi section is followed by double gravity-type drop separation with drop recirculation. For drop separation, preferably a centrifugal separator, operated at high speeds >10 m/s, is used, which may at the same time be employed for superheating via the generation of a throttle effect. In the event that there is a following metal filter stage, there is therefore no occurrence of drops, so that this unit may also be arranged, lower-lying or at the same height, thus reducing the space requirement and space height.

For further dehumidification and prefiltering, a fiber separator in the exhaust air stream with fibers <50 μm is advantageously combined with a prefilter unit with fibers <20 μm, preferably in decreasing fiber thicknesses. Fine filtering preferably takes place with fibers of up to <5 μm, so that even the small quantity of penetrating fine aerosols of <0.5 μm can still largely be retained. The filter elements are preferably produced from high-grade steel fibers. Fine filtering may also take place with sintered fiber filters having pore diameters <2 μm.

For effective organoiodine separation, preferably, a molecular sieve, for example coated with silver nitrate or other silver compounds, etc., is provided, downstream of the throttling, for the long-term operation of the retention system. The superheating of the gas stream before entry into the molecular sieve in this case expediently takes place primarily by throttling, by an amount of at least 50% of the still available pressure gradient of, for example, >2 bar with respect to the maximum operating pressure. Passive and simple superheating of the gas stream in the iodine sorption filter thereby becomes possible.

The retention devices, that is to say the Venturi scrubber and the metal fiber filter, may also be accommodated within a vessel at a staggered height, the high-lying filters being provided with an inflow weir, so that a particularly small overall height is obtained.

In order in this case to allow feedback in the manner of a completely passive system without recourse to external active components, in a further advantageous embodiment the vessel is arranged so as to lie geodetically at least about 5 m, preferably at least 10 m, higher than the outlet point of the pressure relief line from the safety containment. Consequently, the feedback of the activity-laden washing liquid through the pressure relief line into the containment is possible solely on account of the geodetic pressure in the water column between the pressure relief line and the vessel, so that jet feedback can take place in countercurrent to the gas stream without further active aids.

Advantageously, the washing liquid is designed to a particular extent for an effective retention of iodine or iodine-containing compounds. For this purpose, advantageously, a washing liquid with a pH value of at least 9 is reserved in the vessel, and this pH value can be obtained, for example, by the addition of NaOH, other lyes and/or sodium thiosulfate. Adding these chemicals to the washing liquid may advantageously lead to the setting of a concentration in the washing liquid of 0.5 to 5 percent by weight due to intake from a separate chemical vessel via a jet pump located in the freshwater stream.

A particularly compact type of construction can be achieved in that, in a further advantageous embodiment, the throttle device is integrated into the vessel.

By an additionally provided direct feed of cold water completely or partially via the retention device into the region of the reactor pressure vessel in counter-current to the vent gas, preferably as simple emergency measures by means of existing systems, such as, for example, by means of a firefighting pump, or via other systems, activity recirculation and a cooling of the reactor core by the absorption of energy can advantageously be achieved at the same time. Moreover, since higher feed quantities, with a rising filling level in a containment, occur particularly in the early phase of an accident, a further advantageous reduction in the vapor/gas mixture to be sucked away and therefore, at the same time, a reduction in the dimensions of the retention device or suckaway device can be achieved.

As regards the method for the depressurization of a nuclear system of the type mentioned, the object is achieved in that the Venturi scrubber is acted upon by a flow velocity of the medium carried in the pressure relief line of more than 150 m/s, preferably of more than 200 m/s.

The advantages achieved by means of the invention are, in particular, that, owing to the deliberate combination of the throttle device with the Venturi scrubber, the mutually coordinated dimensioning essentially over the entire course of an incident can ensure that a particularly high flow velocity of the depressurization gas stream flows through the Venturi scrubber. As a result, in any event, a particularly high separation action of more than 98% of the entrained airborne activities or aerosols already in the washing liquid, in particular even of the fine aerosols with a particle size of less than 0.5 μm, is ensured, so that a release of activities into the surroundings is avoided particularly reliably.

The depressurization and activity retention system formed by the Venturi scrubber, the following throttle device and, if appropriate, the metal fiber fine filter in this case, in the manner of a passively operating system, automatically ensures, in virtually all the phases of an incident, an essentially constant through-flow through the Venturi scrubber, independently of the system pressure prevailing in the safety containment, so that this system is suitable, in particular, for what is known as sliding-pressure operation, that is to say for direct action by the system pressure in the safety containment without a further preceding throttle device. Depending on the flow medium carried in the pressure relief line, the virtually constant throughput through the Venturi scrubber can in this case be ensured by the critical depressurization via the throttle device, as a result of which, independently of the prevailing system pressure, the flow velocity of the medium in the throttle device amounts approximately to its sound velocity, so that the volumetric throughput through the Venturi scrubber is correspondingly also constant approximately independently of pressure. In the event of a gas mixture carried in the pressure relief line, moreover, with comparatively high nozzle velocities of 150 m/s to 200 m/s, limited to <300 m/s in the case of, for example, a high $H_2$ fraction, being maintained, a mixture-independent passive throughput limitation through the Venturi scrubber can be ensured even by means of the pressure loss generated by the latter.

As a result of the combination of the high-velocity Venturi scrubber device with recirculation, combined with the following metal fiber filters, an overall degree of separation of >99.99 to 99.999% can be ensured even in long-term operation, independently of the aerosol concentration in the containment.

Other features which are considered as characteristic for the invention are set forth in the appended claims.

Although the invention is illustrated and described herein as embodied in a nuclear system and method for the decompression of a nuclear system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
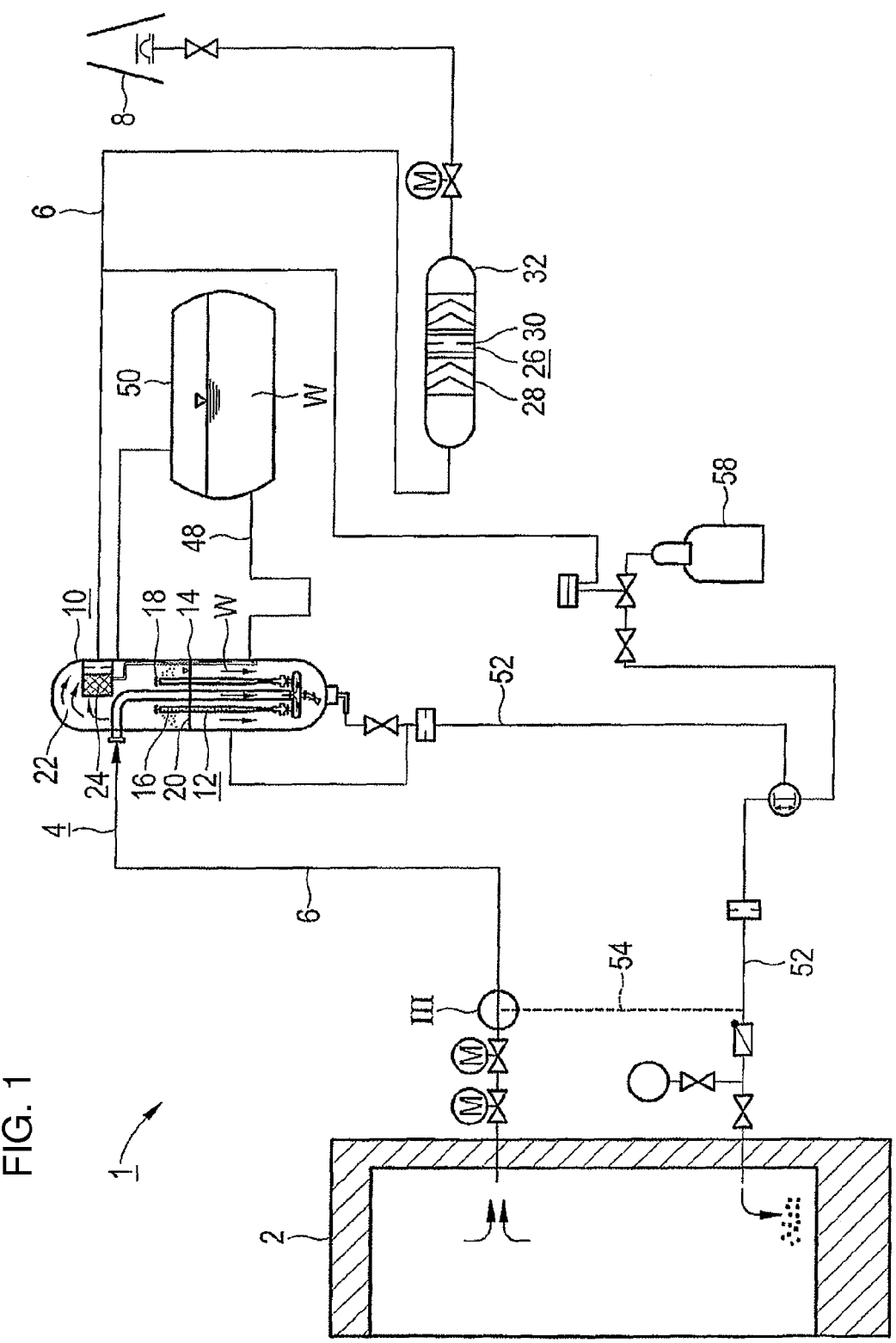
FIG. 1 is a schematic view showing a nuclear technology plant with an assigned pressure relief and activity retention system.

Referring now to the figures of the drawing in detail and first, particularly, to FIG. 1 thereof, there is shown a nuclear plant 1 (also: nuclear engineering installation, nuclear technology plant) with a containment 2 that contains the nuclear components provided for electricity generation and further system components. So that structural damage to or instabilities of the safety containment 2 can be reliably ruled out even in the event of a comparatively serious incident in which a sharp pressure rise within the safety containment 2 must be expected as a result of processes taking place within the containment 2, the nuclear plant 1 is equipped with a depressurization and activity retention system 4 connected to the containment 2. This system makes it possible, as required, to have a deliberate and controlled discharge of containment atmosphere, also designated as venting, out of the safety containment 2 into its surroundings.

The depressurization and activity retention system 4 comprises a pressure relief line 6 which is connected to the safety containment 2 and which is connected on the outlet side to a blow-off vent or stack 8. To avoid a contamination of the surroundings of the nuclear plant 1 in the event of a venting or discharge of containment atmosphere, the depressurization and activity retention system 4 is designed for a reliable retention also of airborne activities or aerosols contained in the containment atmosphere. For this purpose, the depressurization and activity retention system 4 comprises a wet scrubber 10 provided as a filter device for such airborne activities or aerosols.

The wet scrubber 10 itself comprises a Venturi scrubber 12 which is connected into the pressure relief line 6 and which is disposed in a container or vessel 14 having a washing liquid W. The Venturi scrubber 12 comprises a number of Venturi tubes 16 which issue with their outlets 18 into a gas space 22 located in the vessel 14 above the setpoint level 20 of the washing liquid W. A throttle device 24 is arranged in the gas space 22, and is thus integrated into the vessel 14, and is therefore connected in series with the Venturi scrubber 12 on the gas-stream side. The throttle device 24 is itself connected on the outlet side to a further portion of the pressure relief line 6, said further portion being connected to the blow-off chimney 8 via a filter device 26. The filter device 26 itself comprises a metal fiber filter 28, an intermediate throttle 30 and, following, a molecular sieve 32. The metal fiber filter 28 is in this case designed, in particular, as a fine filter with fiber filter mats having a decreasing fiber diameter of 40 µm to approximately 1 µm, so that, in particular, even penetrating fine aerosols with a particle size of less than 0.5 µm can be effectively retained. Additionally or alternatively, the Venturi scrubber 12 may also be followed by preferably double gravity-type drop separation with drop recirculation.

The depressurization and activity retention system 4 of the nuclear plant 1 is designed for particularly reliable activity retention and, in particular, for a degree of separation of the washing device of even comparatively fine-grained aerosols with a particle size of less than 0.5 µm of 98% or above. For this purpose, the Venturi scrubber 12 and the throttle device 24 are deliberately coordinated with one another in terms of their dimensioning. This is based on the design aim that, in a response situation, the depressurization gas stream flows through the Venturi scrubber 12 at a particularly high flow velocity of more than 150 m/s, in particular of more than 200 m/s. To be precise, as became apparent, with such high flow velocities, a virtually abrupt rise in the separation rate can be achieved, and, in particular, even fine and the finest possible aerosol particles are bound in washing liquid droplets and are thus separated.

A suitable selection of, in particular, the flow cross sections ensures in this case that, in virtually all the phases of an incident scenario, such a high flow velocity prevails in the Venturi scrubber 12. For this purpose, on the one hand, the throttle device 24 is designed, in a response situation, for operating essentially, that is to say at a system pressure above a limit pressure, in the range of critical depressurization. As a result, the sound velocity relevant for the flow medium is established in the gas stream flowing through the throttle device 24, independently of the system pressure prevailing in the safety containment 2. Owing to this flow velocity in the throttle device 24 which is independent of the system pressure in the safety containment 2, the volumetric throughput through the throttle device 24 is constant essentially independently of the system pressure prevailing in the safety containment 2, so that the volumetric throughput through the preceding Venturi scrubber 12 also correspondingly remains constant.

To allow for sliding-pressure operation, that is to say direct action by the system pressure prevailing in the safety containment 2, the depressurization and activity retention system 4 is thus designed for ensuring that the flow passes at a correspondingly highly selected flow velocity through the Venturi scrubber 12 uniformly and virtually independently of the system pressure prevailing in the safety containment 2. This is also achieved in that the relevant pressure losses in the inflow line from the containment are minimized by the use of eccentric flaps with a low pressure loss and having zeta values <1, preferably <0.5.

Figure 2:
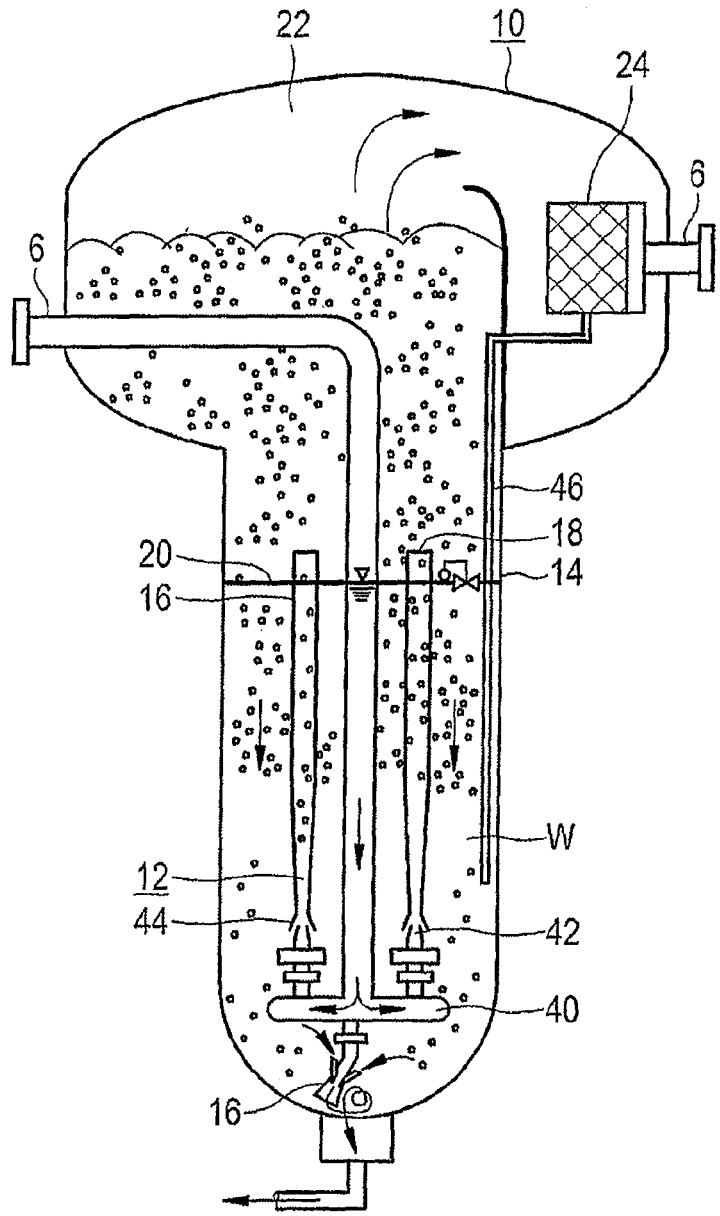
FIG. 2 shows a vessel with a Venturi scrubber.

As can be seen in the enlarged illustration according to FIG. 2, the Venturi scrubber 12 comprises a plurality of Venturi tubes 16. The Venturi tubes 16 are in this case fed on the gas-stream side by a common supply system 40 connected on the inlet side to the pressure relief line 6. A comparatively large fraction of the Venturi tubes 16 is designed as what are known as long Venturi tubes which are arranged with their outlets 18 above the intended desired level 20 of the washing liquid W and which therefore issue directly into the gas space 22 in the manner of a "freely ejecting" arrangement. Furthermore, however, there is also provision for preventing soiling or an impairment of the operating behavior of the Venturi scrubber 12 due to settling or sedimentation, in that a comparatively small fraction, to be precise less than 10%, of the Venturi tubes 16 are oriented obliquely downward. An intensive circulation of the washing liquid W within the vessel 14 is achieved by means of these Venturi swirlers, so that sedimentation is reliably avoided.

In particular, the Venturi tubes 16 designed as long Venturi tubes are designed for a comparatively high water load of the gas stream requiring treatment of more than 5, in particular more than 10, liters of washing liquid W per cubic meter of gas. For this purpose, an annular slit feed over the nozzle circumference at an opening angle of 30° to 45° is provided in the Venturi tubes 16 in the inlet region 42 for the washing liquid W. The dimensioning is in this case carried out in such a way that the ratio of the neck cross-sectional area determined at the constriction point 44 or neck, as it is known, of each Venturi tube 16 to the inlet area for the washing liquid W, determined at the annular slit feed, amounts to about 3:1. Moreover, the constriction point 44 is also that point at which the gas stream flowing through has its maximum flow velocity; consequently, the flow velocity taken into account for the design and coordination of the Venturi scrubber 12 and of the throttle device 24 is also determined at the constriction point 44.

In the exemplary embodiment, the Venturi tubes 16 designed as long Venturi tubes are designed as round Venturi tubes with a neck width of less than 40 mm, so that, in the case of a passive intake and distribution of the washing liquid due to the underpressure generated by the medium flowing through, a feed of the washing liquid W into the core jet region inside the respective Venturi tube 16 is ensured. Furthermore, the Venturi tubes 16 have a ratio of height to neck width of more than 10.

As may also be gathered, moreover, from the enlarged illustration according to FIG. 2, the throttle device 24 for drop separation is provided with an outflow tube 46 which issues on the outlet side into the washing liquid W. The throttle device 24 is itself connected on the outlet side to the pressure relief line 6.

As may be seen, furthermore, from FIG. 1, to allow a particularly compact type of construction of the vessel 14, a multicomponent stock of washing liquid W is provided. On the one hand, washing liquid W in which the Venturi scrubber 12 is arranged is reserved in the vessel 14. Additionally, and to supplement this, however, the vessel 14 is connected on the washing-fluid side to a further washing liquid store 50 via a feed line 48. The washing liquid store 50 may be a receptacle which is designed specifically for this purpose and which is selected so as to lie at a geodetically suitable height for a reliable afterfeed of washing liquid W into the vessel 14, the desired level 20 of the washing liquid W in the vessel 14 being set by means of the height, set in the further washing liquid store 50, of the washing liquid W reserved there. Alternatively, however, the further washing liquid store 50 provided may also be a water tank provided in any case, such as, for example, a wastewater tank, a demineralized supply or the like, while the on-demand afterfeed of washing liquid W into the vessel 14 may take place via suitably selected gradients or, for example, by means of diaphragm pumps or compressed air.

Furthermore, the vessel 14 is connected on the washing-fluid side to the interior of the safety containment 2 via a feedback line 52. This makes it possible to have, in the manner of a feedback, a recirculation of washing liquid W laden with airborne activities or with aerosols out of the vessel 14 into the safety containment 2. Consequently, by the constant or cyclic recirculation of washing liquid W laden in this way, the activity can be held in its entirety inside the safety containment 2 particularly reliably, so that the risk of a discharge into the surroundings is kept particularly low. Moreover, precisely because of such a recirculation of the washing liquid W, the decay heat imported via the retained activities can also be displaced consistently out of the vessel 14 back into the safety containment 2, so that the evaporation of washing liquid W in the vessel 14 is kept particularly low. Despite the recirculation of washing liquid W into the interior of the safety containment 2 and an afterfeed of washing liquid W out of the further washing liquid store 50, the overall consumption of washing liquid W which occurs can consequently be kept particularly low as a result of the avoidance of evaporation.

Figure 3:
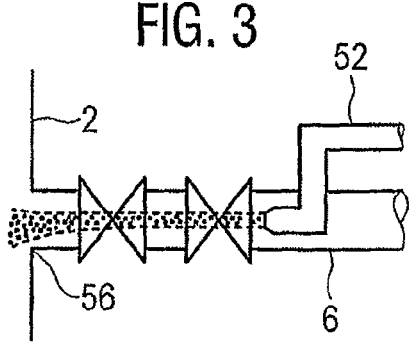
FIG. 3 shows a detail of a feed point of the system according to FIG. 1.

As indicated by the dashed line 54, the feedback line 52 may be connected to the interior of the safety containment 2 via the pressure relief line 6. As illustrated in the enlargement of a detail in FIG. 3, the recirculation in this case takes place in the manner of a passive form in countercurrent to the gas stream emerging from the safety containment 2, no additional leadthrough through the safety containment 2 being required. In order in this case to ensure a sufficient feed pressure for the washing liquid W to be fed back, in the exemplary embodiment the vessel 14 together with the washing liquid W located in it is arranged at a sufficient geodetic height, to be precise about 10 m above the outlet point 56 of the pressure relief line 6 from the safety containment 2. Thus, solely due to the geodetic pressure in the water column in the feedback line 52, a sufficient feedback pressure for the washing liquid W into the safety containment 2 is ensured in the manner of a passive system.

Alternatively, a cyclic feedback by the closing of the outlet fitting in the event of overpressure in the containment or the utilization of a separate small line of small subcritical cross section and corresponding action by pumps, for example a compressed-air diaphragm pump or a centrifugal pump, may also be provided. The components necessary for this purpose, for example a compressed-air reservoir 58, are illustrated diagrammatically in FIG. 1.

For reliable iodine retention, the pH value in the washing liquid W in the vessel 14 is set at an alkaline value, in particular a value of more than 9. For this purpose, an on-demand addition of NaOH, other lyes and/or sodium thiosulfate takes place by intake via a jet pump located in the freshwater stream.

I claim:

1. A nuclear plant, comprising:
a containment;
a pressure relief line communicating with said containment;
a throttle device and a Venturi scrubber connected in series in said pressure relief line, said Venturi scrubber being disposed in a vessel with a washing liquid;
said Venturi scrubber and said throttle device being dimensioned to establish, in the event of a critical depressurization of an air/vapor mixture flowing in said pressure relief line and through said throttle device, a flow velocity of the air/vapor mixture of more than 150 m/s in the Venturi scrubber.

2. The nuclear plant according to claim 1, wherein said Venturi scrubber and said throttle device are dimensioned to establish a flow velocity through said Venturi scrubber of more than 200 m/s.

3. The nuclear plant according to claim 1, wherein said Venturi scrubber comprises a multiplicity of Venturi tubes having outlets, a comparatively large number of said Venturi tubes are disposed with the respective said outlets above an intended setpoint level of the scrubbing liquid, and a comparatively small number of said Venturi tubes are disposed with an outlet direction directed downward.

4. The nuclear plant according to claim 3, wherein up to approximately 10% of said Venturi tubes are disposed with the outlet direction directed downward.

5. The nuclear plant according to claim 1, wherein said Venturi scrubber comprises a plurality of Venturi tubes having a throat cross-sectional area and an inlet cross-section area for the scrubbing liquid, and a ratio of said throat cross-sectional area to said inlet area is less than 10:1.

6. The nuclear plant according to claim 5, wherein said ratio is approximately 3:1.

7. The nuclear plant according to claim 1, wherein said Venturi scrubber comprises a plurality of substantially round Venturi tubes with a throat width of less than about 80 mm.

8. The nuclear plant according to claim 7, wherein said throat width of said Venturi tubes is less than about 40 mm.

9. The nuclear plant according to claim 1, wherein said Venturi scrubber comprises a plurality of substantially flat Venturi tubes with a throat width of less than about 100 mm.

10. The nuclear plant according to claim 1, wherein said Venturi scrubber comprises a plurality of Venturi tubes with a height to throat width ratio of more than 5.

11. The nuclear plant according to claim 1, wherein said Venturi scrubber comprises a plurality of Venturi tubes with a height to throat width ratio of more than 10.

12. The nuclear plant according to claim 1, which further comprises a washing liquid reservoir connected to said vessel on a scrubbing liquid side thereof.

13. The nuclear plant according to claim 1, which further comprises a feedback line connecting a scrubbing liquid side of said vessel to an interior of said containment.

14. The nuclear plant according to claim 13, wherein said feedback line is connected via said pressure relief line to the interior of said containment.

15. The nuclear plant according to claim 14, wherein said vessel is disposed geodetically lying at least approximately 5 m higher than an exit point of said pressure relief line from said containment.

16. The nuclear plant according to claim 15, wherein said vessel is disposed at least 10 m above said exit point.

17. The nuclear plant according to claim 1, wherein the washing liquid in said vessel has a pH of at least 9.

18. The nuclear plant according to claim 1, which further comprises, following said Venturi scrubber in a flow direction, a molecular sieve coated with silver compounds.

19. The nuclear plant according to claim 1, wherein said throttle device is integrated into said vessel.

20. A method for depressurizing a nuclear plant according to claim 1, which comprises subjecting the Venturi scrubber to a flow velocity of the medium carried in the pressure relief line of more than 150 m/s.

21. The nuclear plant according to claim 20, which comprises setting the flow velocity to more than 200 m/s.

* * * * *